(12) United States Patent
Hwang et al.

(10) Patent No.: US 7,295,529 B2
(45) Date of Patent: Nov. 13, 2007

(54) METHOD FOR BRANCHING DATA IN MOBILE COMMUNICATION TERMINAL

(75) Inventors: In Tae Hwang, Kyonggi-do (KR);
Sang Rim Shin, Kyonggi-do (KR);
Myoung Jin Ok, Seoul (KR)

(73) Assignee: LG Electronics Inc., Souel (KR)

(*) Notice: Subject to any disclaimer, the term of this patent is extended or adjusted under 35 U.S.C. 154(b) by 97 days.

(21) Appl. No.: 11/029,487

(22) Filed: Jan. 6, 2005

(65) Prior Publication Data

US 2005/0122924 A1    Jun. 9, 2005

Related U.S. Application Data

(63) Continuation of application No. 09/406,844, filed on Sep. 29, 1999.

(30) Foreign Application Priority Data

Oct. 1, 1998   (KR) ............................... 1998-41481

(51) Int. Cl.
*H04B 7/00* (2006.01)
*H04B 7/212* (2006.01)

(52) U.S. Cl. ...................... 370/310; 370/348; 370/338; 370/352; 370/353; 455/452.1

(58) Field of Classification Search ........ 455/450–453, 455/62–63.3, 67.11, 67.13, 445, 509–511, 455/426.1, 809–811; 370/329–332, 310, 370/382–383, 322–324, 442, 384–388, 376, 370/334–355

See application file for complete search history.

(56) References Cited

U.S. PATENT DOCUMENTS 5,640,395 A * 6/1997 Hamalainen et al. ....... 370/322

(Continued)

FOREIGN PATENT DOCUMENTS

WO        WO97/34436        9/1997

(Continued)

OTHER PUBLICATIONS

European Office Action dated Dec. 23, 2004.

*Primary Examiner*—Pablo N. Tran
(74) *Attorney, Agent, or Firm*—Ked & Associates, LLP

(57) ABSTRACT

A method for branching data in a mobile communication terminal to perform data communication between a mobile station and a network which have media access control sublayers. In a data sending mode, each of the media access control sublayers of the mobile station and network attaches logical channel types based on traffic characteristic information and a radio bearer status to a media access control header contained in data to be sent. Then, each of the media access control sublayers branches the data to be sent, to transport channels corresponding to the attached logical channel types. In a data receiving mode, each of the media access control sublayers determines logical channels corresponding to logical channel types of a media access control header contained in received data. Then, each of the media access control sublayers branches the received data to the determined logical channels. Each of the media access control sublayers performs mapping and muitiplexing/demultiplexing between logical channels and transport channels according to traffic characteristics to branch data. Therefore, it is possible to efficiently provide various multimedia and packet services.

9 Claims, 2 Drawing Sheets

U.S. PATENT DOCUMENTS

| | | | |
|---|---|---|---|
| 5,729,541 A * | 3/1998 | Hamalainen et al. | 370/337 |
| 5,754,537 A | 5/1998 | Jamal | |
| 6,236,646 B1 * | 5/2001 | Beming et al. | 370/335 |
| 6,292,471 B1 * | 9/2001 | Cao et al. | 370/252 |
| 6,374,112 B1 * | 4/2002 | Widegren et al. | 370/352 |
| 6,400,695 B1 * | 6/2002 | Chuah et al. | 370/310 |
| 6,434,130 B1 * | 8/2002 | Soininen et al. | 370/331 |
| 6,438,119 B1 * | 8/2002 | Kim et al. | 370/335 |
| 6,438,375 B1 * | 8/2002 | Muller | 455/435.3 |
| 6,456,604 B1 * | 9/2002 | Lee et al. | 370/328 |
| 6,490,453 B1 * | 12/2002 | Lee et al. | 455/450 |
| 2001/0043576 A1 * | 11/2001 | Terry | 370/328 |
| 2002/0090940 A1 * | 7/2002 | Chen et al. | 455/422 |

FOREIGN PATENT DOCUMENTS

| | | |
|---|---|---|
| WO | WO9734436 | 9/1997 |

* cited by examiner

METHOD FOR BRANCHING DATA IN MOBILE COMMUNICATION TERMINAL

CROSS-REFERENCE TO RELATED APPLICATIONS

This application is a Continuation Application of prior U.S. patent application Ser. No. 09/406,844 filed on Sep. 29, 1999, which claims priority under 35 U.S.C. §119 to Korean Application No. 41481/1998 filed on Oct. 1, 1998, whose entire disclosure is hereby incorporated by reference.

BACKGROUND OF THE INVENTION

1. Field of the Invention

The present invention relates in general to mobile communication terminals, and more particularly to a method for branching data in a mobile communication terminal.

2. Description of the Prior Art

Until now, a conventional mobile communication system has provided only a pure speech service or a simple short message service (referred to hereinafter as SMS). With a third-generation mobile communication system being developed, there have recently been proposed a multimedia service and short/long packet services.

Such third-generation services require a new layer, which is called a media access control (referred to hereinafter as MAC) sublayer.

The MAC sublayer has to perform a branching operation suitable to a service characteristic in order to appropriately process a variety of services.

However, the conventional mobile communication system is disadvantageous in that the MAC sublayer cannot efficiently branch various multimedia and packet services because the system provides only simple services such as the SMS.

SUMMARY OF THE INVENTION

Therefore, the present invention has been made in view of the above problem, and it is an object of the present invention to provide a method for branching data in a mobile communication terminal, in which a media access control sublayer attaches logical channel types based on traffic characteristic identifiers from a radio resource control layer and other upper layers to a media access control header and performs mapping and multiplexing/demultiplexing between logical channels and transport channels according to the attached logical channel types to branch the data.

In accordance with one aspect of the present invention, in a method for performing data communication between a mobile station and a network which have media access control sublayers, respectively, there is provided a method for branching data in a mobile communication terminal, comprising the first step of allowing each of the media access control sublayers of the mobile station and network to attach logical channel types based on traffic characteristic information and a radio bearer status to a media access control header contained in data to be sent, in a data sending mode; the second step of allowing each of the media access control sublayers to branch the data to be sent, to transport channels corresponding to the attached logical channel types; the third step of allowing each of the media access control sublayers to determine logical channels corresponding to logical channel types of a media access control header contained in received data in a data receiving mode; and the fourth step of allowing each of the media access control sublayers to branch the received data to the determined logical channels.

Preferably, each of the second and fourth steps may include the step of allowing each of the media access control sublayers to perform a channel mapping operation in a one-to-one manner, a channel multiplexing operation in a many-to-one manner and a channel demultiplexing operation in a one-to-many manner to branch the data to be sent or the received data.

Further, preferably, the traffic characteristic information may include traffic characteristic identifiers transferred from a radio resource control layer and other upper layers.

Further, preferably, each of the traffic characteristic identifiers may represent any one of random access data, synchronization data, system information, paging information, forward access grant information, short message service data, no radio bearer-type short packet data, signaling data, radio bearer-type short/long packet data, multicast signaling data, multicast data and speech characteristics.

In accordance with another aspect of the present invention, in a method for performing data communication between a mobile station and a network which have media access control sublayers, respectively, there is provided a method for branching data in a mobile communication terminal, comprising the first step of allowing each of said media access control sublayers of said mobile station and network to set information regarding connection between logical channels and transport channels on the basis of traffic characteristic information and a radio bearer status; the second step of allowing each of said media access control sublayers to attach logical channel types based on the set connection information to a media access control header contained in data to be sent, in a data sending mode; and the third step of allowing each of said media access control sublayers to branch said data to be sent, to transport channels corresponding to the attached logical channel types.

In a feature of the present invention, a media access control sublayer attaches logical channel types based on traffic characteristic identifiers from a radio resource control layer and other upper layers to a media access control header and performs mapping and multiplexing/demultiplexing between logical channels and transport channels according to the attached logical channel types to branch data. This makes it possible to efficiently provide various multimedia and packet services.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF THE PREFERRED EMBODIMENTS

Figure 1A:
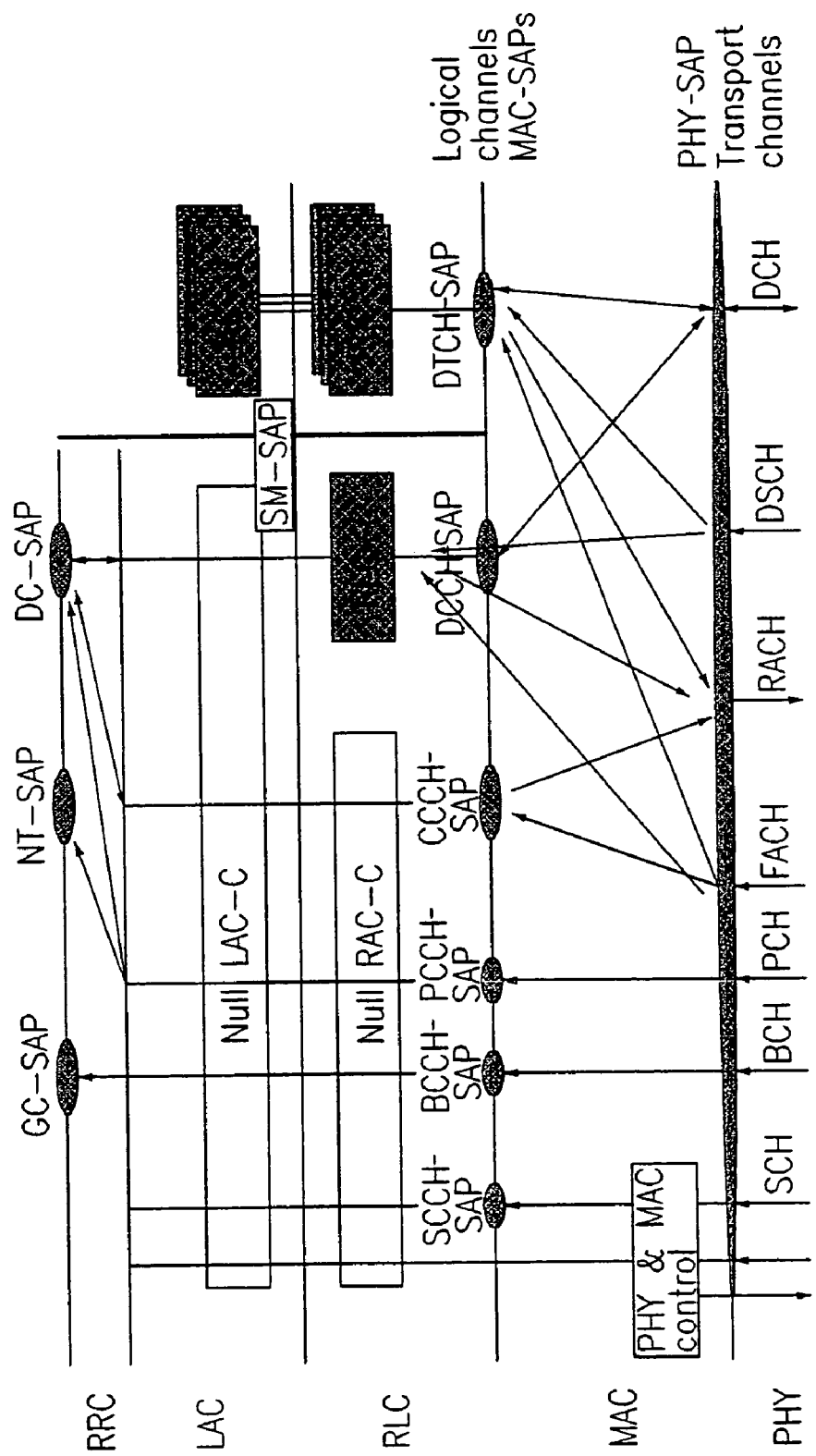
FIGS. 1a and 1b are views illustrating data branched states between mobile and base stations to which a method for branching data in a mobile communication terminal in accordance with the present invention is applied.
Figure 1B:
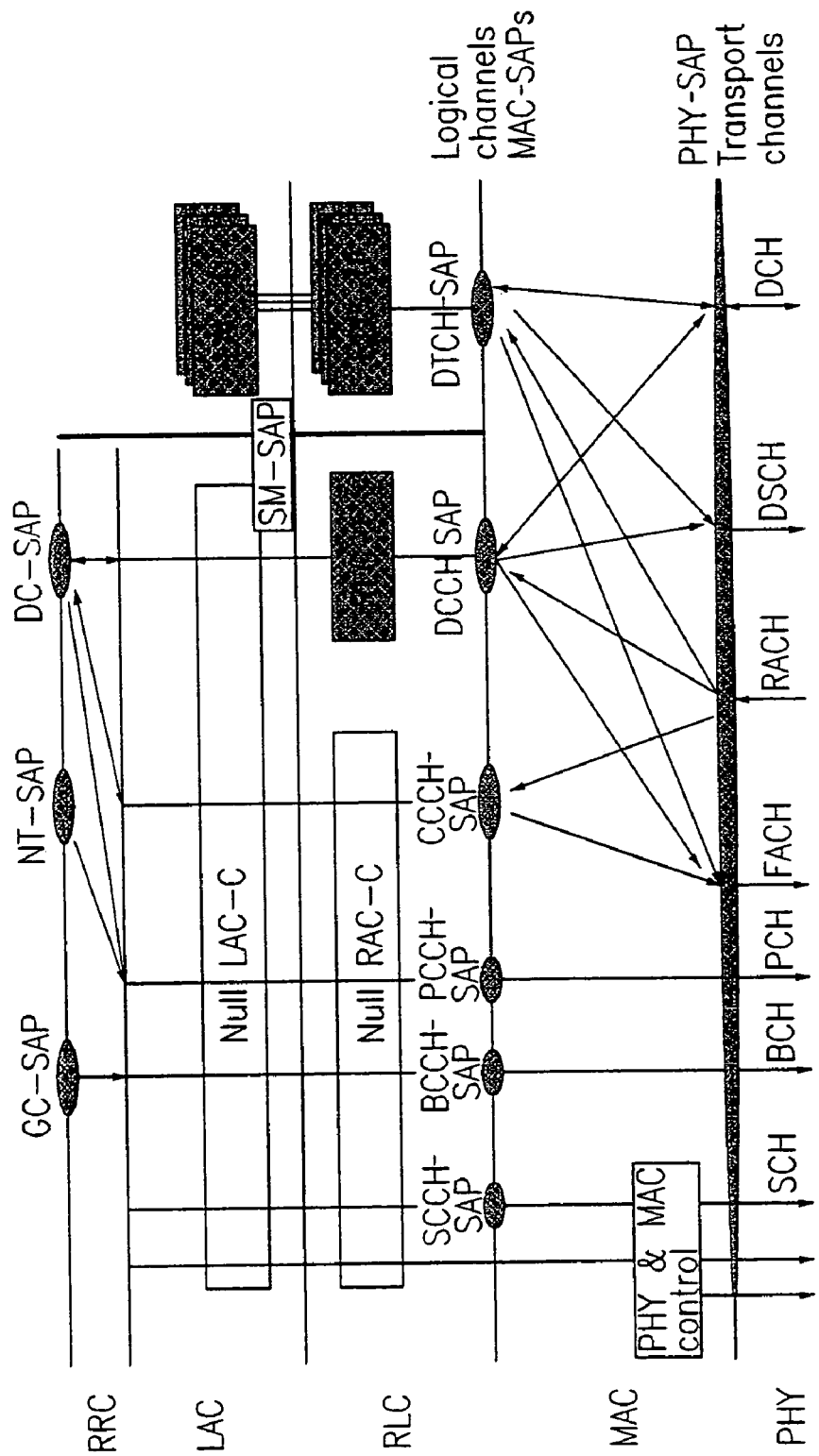

FIGS. 1a and 1b are views illustrating data branched states between mobile and base stations to which a method for branching data in a mobile communication terminal in accordance with the present invention is applied.

A method for branching data in a mobile communication terminal in accordance with the present invention will hereinafter be described in detail with reference to FIGS. 1a and 1b.

As shown in FIGS. 1a and 1b, channels associated with a MAC sublayer are classified into logical channels and transport channels.

The logical channels are mapped into MAC-service access points (referred to hereinafter as SAPS) in interfaces between the MAC sublayer and upper layers, respectively.

The above logical channels may generally be classified into a synchronization control channel (referred to hereinafter as SCCH) for transferring system synchronization data in simplex through a downlink, a broadcast control channel (referred to hereinafter as BCCH) for broadcasting system information in simplex through the downlink, a paging control channel (referred to hereinafter as PCCH) for transferring paging information in simplex through the downlink, a common control channel (referred to hereinafter as CCCH) for transferring random access data, forward access control data and short packet data in duplex through the downlink and an uplink, a dedicated control channel (referred to hereinafter as DCCH) for transferring dedicated signal control information in duplex through the downlink and uplink, and a dedicated traffic channel (referred to hereinafter as DTCH) for transferring dedicated user long/short packet data in duplex through the downlink and uplink.

The CCCH, DCCH and DTCH are adapted to transfer some data on the basis of the connection between the MAC sublayer and a radio resource control (referred to hereinafter as RRC) layer and the presence of a radio bearer. Namely, the CCCH transfers random access data under the condition that the RRC layer is not connected to the MAC sublayer, and the DCCH transfers SMS data, signaling data and a multicast signal under the condition that the RRC layer is connected to the MAC sublayer. The DTCH transfers short/multicast packet data under the condition that no radio bearer is present and short/long/multicast packet data under the condition that a radio bearer is present.

The above multicast signal, short/multicast packet data and short/long/multicast packet data are available only on a network.

The transport channels are mapped into physical (referred to hereinafter as PHY)-SAPs in interfaces between the MAC sublayer and PHY layers, respectively.

The above transport channels may generally be classified into a synchronization channel (referred to hereinafter as SCH) including first and second channels for transferring a system synchronization signal, a broadcast channel (referred to hereinafter as BCH) for broadcasting system information in simplex through the downlink, a paging channel (referred to hereinafter as PCH) for transferring paging information in simplex through the downlink, a forward access channel (referred to hereinafter as FACH) for transferring forward access grant information and short packet data in simplex through the downlink, a random access channel (referred to hereinafter as RACH) for transferring random access data and short packet data in simplex through the uplink, a downlink shared channel (referred to hereinafter as DSCH) for multicasting user data in simplex through the downlink, and a dedicated channel (referred to hereinafter as DCH) for transferring dedicated signal information and dedicated user data in duplex through the downlink and uplink.

On the other hand, in a sending entity, the MAC sublayer has to create a MAC protocol data unit (PDU) with a MAC header including a type of a logical channel through which upper layer data is to be transferred. In a receiving entity, the MAC sublayer utilizes the logical channel type of the MAC header to determine a logical channel into which the received MAC PDU is to be demultiplexed. This procedure will hereinafter be described in detail while being classified into channel mapping and channel multiplexing/demultiplexing between a mobile station and a network.

First, a description will be given of a channel mapping operation for data sending and reception between the mobile station and network.

The channel mapping operation is performed in the mobile station in the following manner.

In the case where the mobile station is to send data to the network, the MAC sublayer of the mobile station maps the CCCH which is a logical channel for transferring random access data, to the RACH which is a transport channel, in a one-to-one manner.

In the case where the mobile station is to receive data from the network, the MAC sublayer of the mobile station maps the SCH which is a transport channel for transferring signaling data, the BCH which is a transport channel for transferring system information and the PCH which is a transport channel for transferring paging information, respectively, to the SCCH, BCCH and PCCH which are logical channels, in the one-to-one manner.

The channel mapping operation is performed in the network in the following manner.

In the case where the network is to send data to the mobile station, the MAC sublayer of the network maps the SCCH which is a logical channel for transferring system synchronization data, the BCCH which is a logical channel for transferring system information, the PCCH which is a logical channel for transferring paging information and the CCCH which is a logical channel for transferring forward access grant information, respectively, to the SCH, BCH, PCH and FACH which are transport channels, in the one-to-one manner.

Noticeably, the channel mapping operation is not performed in the network with respect to data which is sent from the mobile station to the network.

Next, a description will be given of channel multiplexing/demultiplexing operations of the mobile station.

The channel multiplexing operation of the mobile station is performed in the following manner.

First, the RRC layer and other upper layers of the mobile station transfer traffic characteristic identifiers to the MAC sublayer of the mobile station.

The MAC sublayer of the mobile station attaches logical channel types based on traffic characteristics of the traffic characteristic identifiers from the RRC layer and other upper layers to a MAC header. Then, the MAC sublayer branches data to transport channels corresponding to the attached logical channel types through PHY-SAPs.

The traffic characteristics may generally be random access data, synchronization data, system information, paging information, forward access grant information, SMS data, short packet data (no radio bearer), signaling data, short/long packet data (radio bearer), multicast signaling data, multicast data and speech characteristics.

For example, if the random access data, SMS data and no radio bearer-type short packet data characteristics are required, the MAC sublayer of the mobile station attaches types of the CCCH, DCCH and DTCH to the MAC header and multiplexes the CCCH, DCCH and DTCH to the RACH in a many-to-one manner to branch data through PHY-SAPs. Here, the CCCH is a logical channel for transferring random access data, the DCCH is a logical channel for transferring SMS data, the DTCH is a logical channel for transferring no radio bearer-type short packet data, and the RACH is a transport channel.

In the case where the signaling data and radio bearer-type short/long packet data characteristics are required, the MAC sublayer of the mobile station attaches types of the DCCH and DTCH to the MAC header and multiplexes the DCCH and DTCH to the DCH in the many-to-one manner to branch data through PHY-SAPs. Here, the DCCH is a logical channel for transferring signaling data, the DTCH is a logical channel for transferring radio bearer-type short/long packet data, and the DCH is a transport channel.

The channel demultiplexing operation of the mobile station is performed in the following manner.

The network, or sending entity, attaches logical channel types based on traffic characteristics to a MAC header and the mobile station, or receiving entity, performs the channel demultiplexing operation on the basis of the logical channel types attached to the MAC header.

For example, if a transport channel through which data from the network, or sending entity, is sent is the FACH, the MAC sublayer of the mobile station demultiplexes the FACH to logical channels corresponding to traffic characteristics of logical channel types attached to a MAC header of the sent data in a one-to-many manner to branch the sent data to upper layers through MAC-SAPs.

That is, for example, in the case where the forward access grant information, SMS data and no radio bearer-type short packet data characteristics are required by the sending entity, the MAC sublayer of the mobile station recognizes that logical channel types attached to a MAC header of received data correspond respectively to the CCCH, DCCH and DTCH and demultiplexes the FACH to the CCCH, DCCH and DTCH in the one-to-many manner to branch the received data to upper layers through MAC-SAPs. Here, the FACH is a transport channel, and the CCCH, DCCH and DTCH are logical channels.

If the multicast signaling data and multicast data characteristics are required by the sending entity, the MAC sublayer of the mobile station recognizes that logical channel types attached to a MAC header of received data correspond respectively to the DCCH and DTCH and demultiplexes the DSCH to the DCCH and DTCH in the one-to-many manner to branch the received data to upper layers through. MAC-SAPs. Here, the DSCH is a transport channel, and the DCCH and DTCH are logical channels.

In the case where the dedicated signaling data and radio bearer-type short/long packet data characteristics are required by the sending entity, the MAG sublayer of the mobile station recognizes that logical channel types attached to a MAC header of received data correspond respectively to the DCCH and DTCH and demultiplexes the DCH to the DCCH and DTCH in the one-to-many manner to branch the received data to upper layers through MAC-SAPs. Here, the DCH is a transport channel, and the DCCH and DTCH are logical channels.

Finally, a description will be given of channel multiplexing/demultiplexing operations of the network.

The channel multiplexing operation of the network is performed in the following manner.

First, the RRC layer and other upper layers of the network transfer traffic characteristic identifiers to the MAC sublayer of the network.

The MAC sublayer of the network attaches logical channel types based on traffic characteristics of the traffic characteristic identifiers from the RRC layer and other upper layers to a MAC header. Then, the MAC sublayer branches data to transport channels corresponding to the attached logical channel types.

The traffic characteristics may generally be random access data, synchronization data, system information, paging information, forward access grant information, SMS data, short packet data (no radio bearer), signaling data, short/long packet data (radio bearer), multicast signaling data, multicast data and speech characteristics.

For example, in the case where the forward access grant information, SMS data and no radio bearer-type short packet data characteristics are required, the MAC sublayer of the network attaches types of the CCCH, DCCH and DTCH to the MAC header and multiplexes the CCCH, DCCH and DTCH to the FACH in the many-to-one manner to branch data through PHY-SAPs. Here, the CCCH is a logical channel for transferring forward access grant information, the DCCH is a logical channel for transferring SMS data, the DTCH is a logical channel for transferring no radio bearer-type short packet data, and the FACH is a transport channel.

If the multicast signaling data and multicast data characteristics are required, the MAC sublayer of the network attaches types of the DCCH and DTCH to the MAC header and multiplexes the DCCH and DTCH to the DSCH in the many-to-one manner to branch data through PHY-SAPs. Here, the DCCH is a logical channel for transferring multicast signaling data, the DTCH is a logical channel for transferring multicast data, and the DSCH is a transport channel.

In the case where the signaling data and radio bearer-type short/long packet data characteristics are required, the MAC sublayer of the network attaches types of the DCCH and DTCH to the MAC header and multiplexes the DCCH and DTCH to the DCH in the many-to-one manner to branch data through PHY-SAPs. Here, the DCCH is a logical channel for transferring signaling data, the DTCH is a logical channel for transferring radio bearer-type short/long packet data, and the DCH is a transport channel.

The channel demultiplexing operation of the network is performed in the following manner.

The mobile station, or sending entity, attaches logical channel types based on traffic characteristics to a MAC header and the network, or receiving entity, performs the channel demultiplexing operation on the basis of the logical channel types attached to the MAC header.

For example, in the case where a transport channel through which data from the mobile station, or sending entity, is sent is the. RACH, the MAC sublayer of the network demultiplexes the RACH to logical channels corresponding to traffic characteristics of logical channel types attached to a MAC header of the sent data in the one-to-many manner to branch the sent data to upper layers through MAC-SAPs.

Namely, for example, if the forward access grant information, SMS data and:no radio bearer-type short packet data characteristics are required by the sending entity, the MAC sublayer of the network recognizes that logical channel types attached to a MAC header of received data correspond respectively to the CCCH, DCCH and DTCH and demultiplexes the RACH to the CCCH, DCCH and DTCH in the one-to-many manner to branch the received data to upper layers through MAC-SAPs. Here, the RACH is a transport channel, and the CCCH, DCCH and DTCH are logical channels.

In the case where the dedicated signaling data and radio bearer-type short/long packet data characteristics are required by the sending entity, the MAC sublayer of the network recognizes that logical channel types attached to a MAC header of received data correspond respectively to the DCCH and DTCH and demultiplexes the DCH to the DCCH and DTCH in the one-to-many manner to branch the received data to upper layers through MAC-SAPs. Here, the DCH is a transport channel, and the DCCH and DTCH are logical channels.

As apparent from the above description, according to the present invention, the MAC sublayer performs mapping and multiplexing/demultiplexing between logical channels and transport channels according to traffic characteristics to branch data. Therefore, the present invention has the effect of efficiently providing various multimedia and packet services.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method of performing data communication between a mobile station and a network, each having a medium access control (MAC) layer, the method comprising:
   (a) mapping a dedicated control channel (DCCH), which is a logical channel, to at least two transport channels for a MAC layer protocol; and
   (b) mapping a dedicated traffic channel (DTCH), which is a logical channel, to said at least two transport channels for the MAC layer protocol,
   wherein during data transmission mode, providing a MAC protocol data unit (PDU), the MAC PDU having a header and data, the header including information indicative of a logical channel type, and
   wherein during data reception mode,
   determining a logical channel based on the logical channel type information contained in the header of the MAC protocol data unit, and branching the received data to a corresponding MAC service access point (SAP) based on the determined logical channel.

2. The method of claim 1, wherein the at least two of transport channel includes a forward access channel (FACH).

3. The method of claim 1, wherein the at least two of transport channels includes a random access channel (RACH).

4. The method of claim 1, wherein the at least two of transport channel includes a downlink shared channel (DSCH).

5. The method of claim 1, wherein the at least two of transport channel includes a dedicated channel (DCH).

6. The method of claim 1, wherein the dedicated control channel (DCCH) and the dedicated traffic channel (DTCH) are bi-directional channels.

7. The method of claim 2, wherein the forward access channel (FACH) is a downlink channel.

8. The method of claim 1, wherein the random access channel (RACH) is an uplink channel.

9. The method of claim 1, wherein the determined logical channel is the dedicated control channel (DCCH) or the dedicated traffic channel (DTCH).

* * * * *